(12) United States Patent
Jeong et al.

(10) Patent No.: US 6,426,933 B1
(45) Date of Patent: Jul. 30, 2002

(54) OPTICAL PICKUP APPARATUS HAVING POLARIZING PHASE PLATES

(75) Inventors: Seong Yun Jeong; Kyung Chan Park, both of Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/413,249

(22) Filed: Oct. 7, 1999

(30) Foreign Application Priority Data

Oct. 8, 1998 (KR) .......................................... P98-42108
Feb. 2, 1999 (KR) .......................................... P99-3415

(51) Int. Cl.$^7$ ................................................ G11B 7/00
(52) U.S. Cl. ................................................ 369/121.17
(58) Field of Search .......................... 369/44.32, 44.23, 369/110.01, 110.02, 110.03, 110.04, 112.06, 112.07, 112.12, 112.18, 112.19, 112.17

(56) References Cited

U.S. PATENT DOCUMENTS 5,519,685 A * 5/1996 Kato et al. ............. 369/112.19

* cited by examiner

Primary Examiner—Paul W. Huber
(74) Attorney, Agent, or Firm—Birch, Stewart, Kolasch & Birch, LLP

(57) ABSTRACT

An optical pickup apparatus that is capable of eliminating a crosstalk component of a high-density optical disc effectively. In the apparatus, a first polarizing phase plate is arranged on a light path of a light-focusing system for irradiating a light beam onto the optical disc. A second polarizing phase plate is arranged on a light path of a light-receiving system for detecting a reflective light from the optical disc. The apparatus is capable of eliminating a crosstalk component optimally by detecting sub-beams separately using the first and second polarizing phase plates consisting of a plurality of phase zones.

5 Claims, 14 Drawing Sheets

——— Just focused
- - - - Near focused
— — — Far focused

OPTICAL PICKUP APPARATUS HAVING POLARIZING PHASE PLATES

BACKGROUND OF THE INVENTION

1. Field of the Invention

This invention relates to an optical pickup apparatus used for recording and reproducing an optical disc, and more particularly to an optical pickup apparatus that is capable of eliminating the crosstalk component of a high density optical disc effectively.

2. Description of the Prior Art

Generally, an optical pickup apparatus irradiates a light on the recording surface of an optical disc to detect the reflected light, thereby performing the information recording and reproducing operation. To this end, the optical pickup apparatus is composed of a laser diode for emitting a light, an objective lens for focusing the emitted light on the recording surface of the disc, and other optical system required for concentrating and receiving the light.

An optical disc, such as a compact disc(CD) or a digital versatile disc(DVD) having more improved recording capacity, has been commercially available. This optical disc has more enlarged use for recording and reproducing audio and video data and computer data, etc. Recently, an optical disc having much more improved recording capacity is expected owing to the development of a blue laser generating a short wavelength of light. There have been suggested several schemes increasing the numerical aperture(NA) of an objective lens or narrowing the track pitch along with the use of a light source such as a blue laser, etc. so as to enlarge a recording capacity of the optical disc. However, it has a problem in that a crosstalk is caused between the adjacent tracks in the case of narrowing the track pitch of the optical disc.

More specifically, since an optical spot irradiated so as to reproduce a certain pit P1 has a larger size than a width of the pit as shown in FIG. 1, it also is irradiated onto the pits in the adjacent tracks. As a result, a crosstalk component caused by the pits in the adjacent tracks is involved in the reproduced signal. A strategy employing a polarizing phase plate as shown in FIG. 2 has been known as one of methods for eliminating such a crosstalk component.

FIG. 2 shows the conventional optical pickup apparatus for eliminating the crosstalk component. In FIG. 2, the optical pickup apparatus includes a light source 12 for generating a light beam, an objective lens 20 for focusing a light beam from the light source 12 on the recording surface of an optical disc 22, first and second photo detectors 30 and 32 for converting a reflective light beam from the optical disc 22 into an electrical signal, a beam splitter 18 arranged among the light source 12, the objective lens 20 and the first and second photo detectors 30 and 32, a polarizing beam splitter(PBS) 26 arranged among the beam splitter 18 and the first and second photo detector 30 and 32, a polarizing phase plate 16 arranged between the light source 12 and the beam splitter 18, a first collimator lens 14 arranged between the polarizing phase plate 16 and the beam splitter 18, a second collimator lens 24 arranged between the beam splitter 18 and the PSB 26, and a sensor lens arranged between the PBS 26 and the first photo detector 30. The light source 12 generates two polarized beams having a polarizing characteristic moving perpendicularly to each other The first collimator lens 14 converts a divergent light beam progressing from the light source 12, via the polarizing phase plate 16, toward the beam splitter 18 into a parallel light beam to prevent a leakage of the light beam. The beam splitter 18 passes a light beam received via the first collimator lens 14 and the polarizing phase plate 16 in such a manner to be progressed toward the objective lens 20, and reflects a reflective light beam reflected from the recording surface of the optical disc 22 and passing through the objective lens 20 in such a manner to be progressed toward the second collimator lens 24. The objective lens 20 focuses an incident light beam from the beam splitter 18 on the recording surface of the optical disc 22. The polarizing phase plate 16 consists of two phase zones 16A and 16B having a phase difference of 180° in the left and right phases thereof as shown in FIG. 3, and which is responsible for selectively changing a phase of the light beam received, via the first collimator lens 14, from the light source 12 in accordance with a polarizing characteristic thereof. More specifically, the polarizing phase plate 16 passes the first polarized beam in any one direction of two polarized beams emitted from the light source 12 as it is, thereby allowing the first polarized beam to be irradiated, via the collimator lens 16 the beam splitter 18 and the objective lens, on the recording surface of the optical disc 22 as a main beam MB as shown in FIG. 2A. On the other hand, the polarizing phase plate 16 passes the second polarized beam in a direction perpendicular to the first polarized beam of two beams from the light source 12 with a phase being modulated, thereby allowing the second polarized beam to be irradiated on the recording surface of the optical disc 22 as a twin-mountain shaped sub-beams SB1 and SB2 superposed at each side of the main beam MB as shown in FIG. 2A. The main beam MB in the light beams irradiated on the recording surface of the optical disc 22 in this manner is irradiated on the signal track to be accessed and is used to reproduced an information signal. On the other hand, the sub-beams SB1 and SB2 are irradiated on the adjacent tracks and is used to detect a crosstalk component included in the reproduced signal. The second collimator lens 24 plays a role to focus a parallel light beam reflected from the optical disc 22 and received via the objective lens 20 and the beam splitter 18. The PBS 26 passes the main beam MB with the first polarization component in a reflective light beams reflected from the beam splitter 18 and received via the second collimator lens 24 as it is in such a manner to be progressed, via the sensor lens 28, toward the first photo detector 30. On the other hand, the PBS 26 reflects the sub-beams SB1 and SB2 with the second polarization component in the reflective light beam in such a manner to be progressed toward the second photo detector 32. The sensor lens 28 focuses the main beam MB with the first polarization component passing through the PBS 26 as it is and being received thereto onto the first photo detector 30. The first photo detector 30 detects a main beam MB received via the sensor lens 28 and the second photo detector 32 detects sub-beams SB1 and SB2 received separately from the PBS 26, thereby converting them into electrical signals.

In other words, the first photo detector 30 detects a radio frequency signal including an reproducing signal from the main beam MB while the second photo detector 32 detects a crosstalk component in the adjacent tracks from the sub-beams SB1 and SB2. A crosstalk component detected at the second photo detector 32 is eliminated from the radio frequency signal detected at the first photo detector 30 to thereby detect a reproducing signal.

The first and second sub-beams SB1 and SB2 reflected from the adjacent tracks have a frequency characteristic different from each other. In particular, when a tilt is generated between the objective lens and the optical disc, two sub-beams SB1 and SB2 have a greatly different frequency characteristic. Accordingly, in order to eliminate a crosstalk component from the radio frequency signal detected at the first photo detector 30 effectively, it is necessary to detect the first and second sub-beams SB1 and SB2 and filter the same with a filter suitable for a frequency characteristic of each sub-beam so as to make an operation on the radio frequency signal detected from the main beam MB. To this end, the second photo detector 32 includes two photo detecting cells for detecting the first and second sub-beams SB1 and SB2. However, the above-mentioned optical pickup apparatus has a problem in that, since a distance between the first sub-beam SB1 and the second sub-beam SB2 focused onto the second photo detector 32 is too narrow, it is difficult to detect them separately at each photo detecting cell.

For instance, when a distance between the sub-beams SB1 and SB2 on the optical disc 22 is set to 0.72 μm and a magnification between the light-focusing zone and the light-receiving zone is ten times, it is difficult to separate the sub-beams SB1 and SB2 effectively because a distance between the sub-beams SB1 and SB2 formed on the second photo detector 32 has only a value of 7.2 μm. It may be considered as a scheme capable of enlarging a distance between the sub-beams SB1 and SB2 to increase a magnification between the light-focusing zone and the light-receiving zone in light of a fact that the distance is proportional to the magnification, but it is difficult to increase the magnification without limit. It is caused by a fact that a distance between the sub-beams irradiated onto the disc must be narrow in compliance with a track pitch reduced so as to improve the recording density of the disc. Accordingly, it is required to provide an apparatus that is capable of enlarging a distance between the sub-beams at the photo detector even though a distance between the sub-beams at the disc is narrow.

In addition, the above-mentioned optical pickup apparatus has a problem in that, when it is applied to an optical disc having a track pitch set to a relatively narrow value so as to provide the high density, it is impossible to eliminate a crosstalk component because the distance between the sub-beams grows distant relatively such that the sub-beams can not irradiated onto the adjacent tracks. In other words, the optical pickup apparatus is unsuitable for an optical disc having a trend toward a high density. Moreover, the above-mentioned optical pickup apparatus has a problem in that, since it needs a polarizing beam splitter 26 and two photo detectors 30 and 32 to detect the sub-beams, a bulk of the pickup becomes not only enlarged to deteriorate a slim type configuration thereof, but also the construction of optical elements becomes complicated to make the manufacture thereof difficult.

SUMMARY OF THE INVENTION

Accordingly, it is an object of the present invention to provide an optical pickup apparatus that is capable of separating sub-beams easily at photo detectors so as to eliminate a crosstalk.

accurately locating a sub-beam at such a position that a crosstalk component can be effectively eliminated.

A further object of the present invention is to provide an optical pickup apparatus that is capable of reducing a distance between sub-beams at an optical disc so as to eliminate a crosstalk and hence is suitable for a high-density optical disc.

A still further object of the present invention is to provide an optical pickup apparatus that is capable of providing sub-beams for eliminating a cross talk with a very simple configuration.

In order to achieve these and other objects of the invention, an optical pickup apparatus according to one aspect of the present invention includes a first polarizing phase plate arranged at a light phase in a light-focusing optical system for irradiating a light beam onto an optical disc; and a second polarizing phase plate arranged at a light phase in a light-receiving optical system for detecting a reflective light from the optical disc.

An optical pickup apparatus according to another aspect of the present invention includes first and second phase plates arranged at a light-focusing optical system and a light-receiving optical system, respectively, wherein a polarization direction of the first phase plate is perpendicular to that of the second phase plate.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
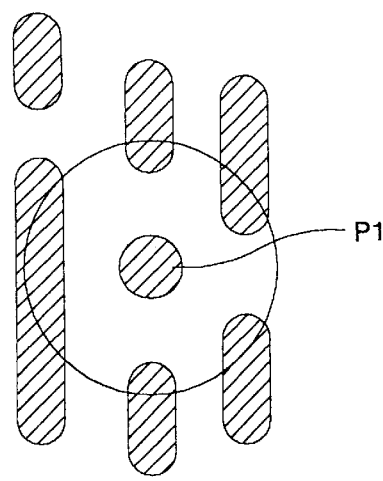
FIG. 1 is a view showing a crosstalk phenomenon.
Figure 2A:
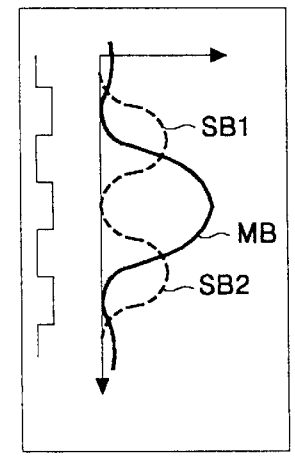
FIG. 2 is a schematic view showing the configuration of a conventional optical pickup apparatus.
Figure 2:
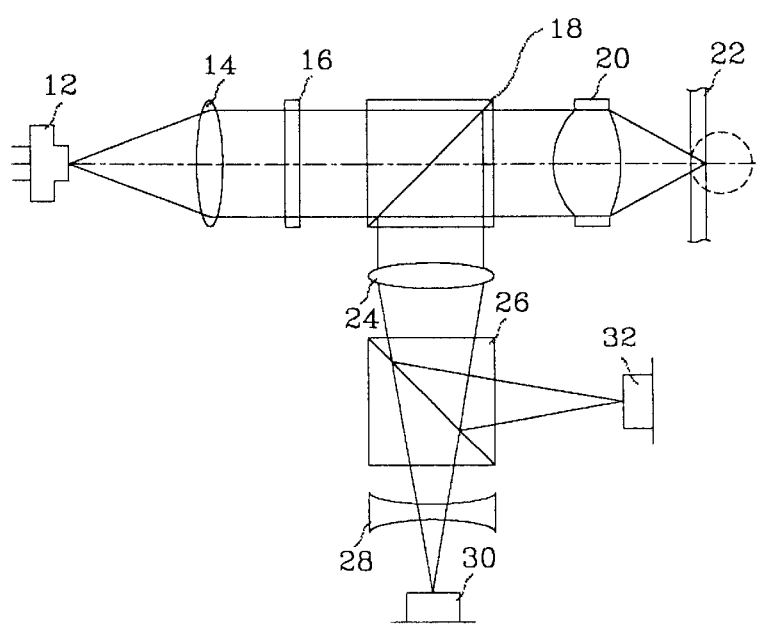
Figure 3:
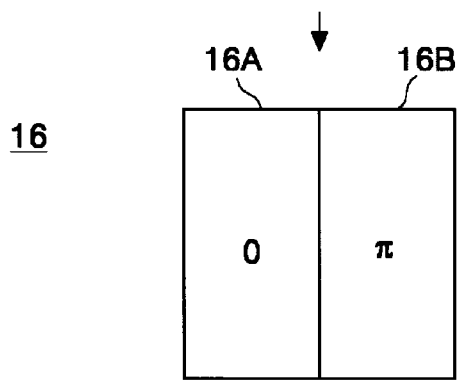
FIG. 3 shows the structure of the polarizing phase plate in FIG. 2.
Figure 4:
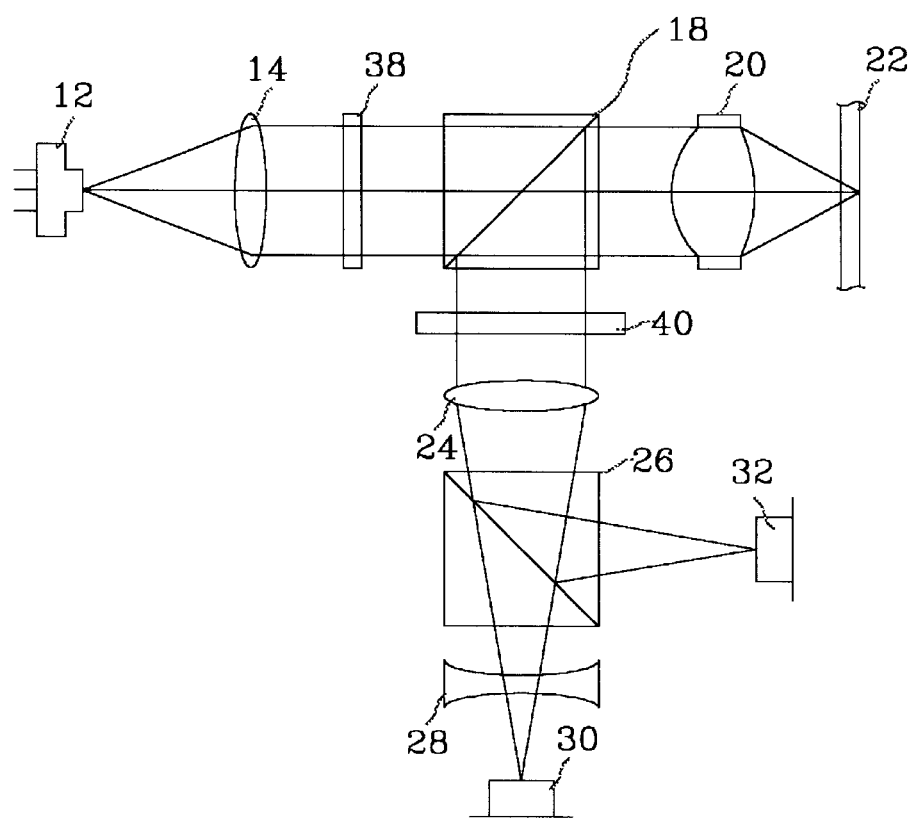
FIG. 4 is a schematic view showing the configuration of an optical pickup apparatus according to an embodiment of the present invention.

Referring to FIG. 4, there is shown an optical pickup apparatus according to an embodiment of the present invention. The optical pickup apparatus allows sub-beams for eliminating a crosstalk to be easily separated at a photo detector. To this end, the optical pickup apparatus includes a light source 12 for generating a light beam, an objective lens 20 for focusing a light beam generated from the light source 12 on the recording surface of an optical disc 22, first and second photo detectors 30 and 32 for converting a reflective light beam from the optical disc 22 into an electrical signal, a beam splitter 18 arranged among the light source 12, the objective lens 20 and the first and second photo detectors 30 and 32, a PBS 26 arranged among the beam splitter 18 and the first and second photo detector 30 and 32, a first polarizing phase plate 38 arranged between the light source 12 and the beam splitter 18, a first collimator lens 14 arranged between the light source 12 and the first polarizing phase plate 38, and a second collimator lens 24 arranged between the beam splitter 18 and the PSB 26, a sensor lens 28 arranged between the PBS 26 and the first photo detector 30, and a second polarizing phase plate 40 arranged between the beam splitter 18 and the second collimator lens 24. The light source 12 generates two polarized beams having a polarizing characteristic moving perpendicularly to each other. The first collimator lens 14 converts a divergent light beam progressing from the light source 12, via the first polarizing phase plate 38, toward the beam splitter 18 into a parallel light beam to prevent a leakage of the light beam. The beam splitter 18 passes a light beam received via the first collimator lens 14 and the first polarizing phase plate 38 in such a manner to be progressed toward the objective lens 20, and reflects a reflective light beam reflected from the recording surface of the optical disc 22 and passing through the objective lens 20 in such a manner to be progressed toward the second collimator lens 24. The objective lens 20 focuses an incident light beam from the beam splitter 18 on the recording surface of the optical disc 22.

Figure 5A:
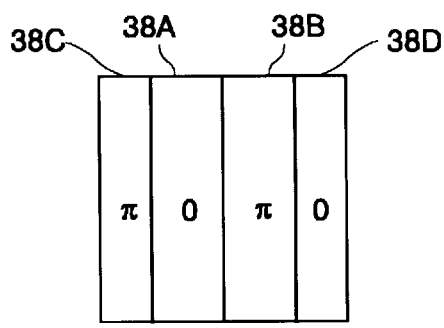
FIG. 5A and FIG. 5B show structures of the first and second polarizing phase plates in FIG. 4, respectively.

The first polarizing phase plate 38 consists of four phase zones 38A, 38B, 38C and 38D arranged in such a manner to have a phase difference of 180° from the adjacent phase zones as shown in FIG. 5A. A first polarized beam emitted from the light source 12 passes through the first polarizing phase plate 38 as it is to be irradiated onto the recording surface of the optical disc 22 as a main beam MB, whereas a second polarized beam is phase-modulated with four phase zones 38A, 38B, 38C and 38D provided at the first polarizing phase plate 38 to be irradiated as twin-mountain shaped sub-beams SB1 and SB2. At this time, a distance between the sub-beams SB1 and SB2 imaged on the optical disc 22 is depend upon a width of the first and second phase zones 38A and 38B located at the center of the first polarizing phase plate 38. In other words, in the first polarizing phase plate 38, a width of the first and second phase zones 38A and 38B is set appropriately in accordance with a track pitch of the optical disc, thereby locating the sub-beams at an accurate position for eliminating a crosstalk component.

Figure 5B:
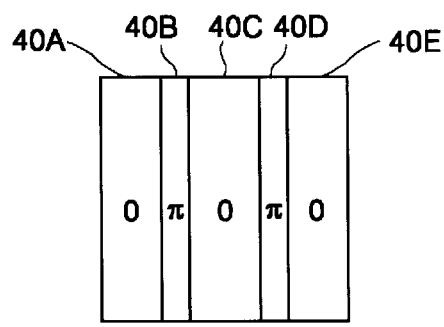
Figure 5C:
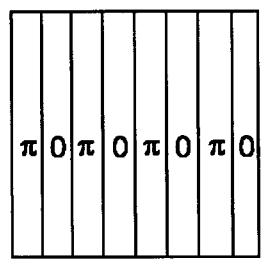
FIG. 5C represents a phase area of light beam passing through the second polarizing phase plate.
Figure 6A:
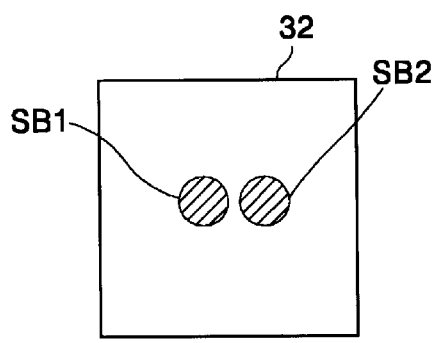
FIG. 6A and FIG. 6B show a shape of sub-beams formed at the second photo detector when the second polarizing plate is not used and when used, respectively.
Figure 6B:
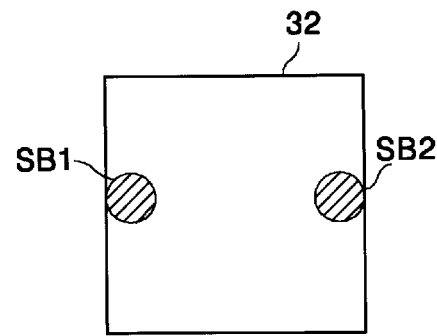

The second polarizing phase plate 40 consists of five phase zones 40A, 40B, 40C, 40D and 40E arranged in such a manner to have a phase difference of 180° from the adjacent phase zones as shown in FIG. 5B. The second polarizing phase plate 40 passes a main beam MB of first polarization component reflected from the optical disc 22 and received via the objective lens 20 and the beam splitter 18 as it is. On the other hand, sub-beams SB1 and SB2 of second polarization component is phase-modulated with the second polarizing phase plate 40. As a result, the sub-beams SB1 and SB2 passing through the first and second polarizing phase plates 38 and 40 and formed at the second photo detector 32 by means of the PBS 26 has eight phase areas with a phase difference periodically as shown in FIG. 5C. Accordingly, a distance between the sub-beams SB1 and SB2 formed at the second photo detector 32 is lengthened. For instance, it can be seen from FIG. 6A and FIG. 6B that a distance between the sub-beams SB1 and SB2 formed at the second photo detector 32 when the second polarizing phase plate 40 is used has about three times difference from that when the second polarizing phase plate 40 is not used.

The second collimator lens 24 is responsible for focusing a reflective light beam received via the beam splitter 18. The PBS 26 passes a main beam MB of first polarization component in a reflective light beam received via the second collimator lens 24 as it is in such a manner to be progressed, via the sensor lens 28, toward the first photo detector 30. On the other hand, the PBS 26 reflects sub-beams SB1 and SB2 of second polarization component in the reflective light beam in such a manner to be progressed toward the second photo detector 32. The sensor lens 28 focuses a main beam MB of first polarization component passing through the PBS 26 as it is onto the first photo detector 30. The first photo detector 30 detects a main beam MB received via the sensor lens 28 and the second photo detector 32 detects sub-beams SB1 and SB2 received separately from the PBS 26, thereby converting them into electrical signals. A distance between the sub-beams SB1 and SB2 formed at the second photo detector 32 by the first and second polarizing phase plates 38 and 40 is lengthened. Accordingly, the second photo detector 32 can detect each sub-beam easily. A reproducing signal in which a crosstalk component has been eliminated can be obtained by filtering each crosstalk component detected from the second photo detector 32 in compliance with a frequency characteristic and then making an operation of the filtered component on a radio frequency signal detected at the first photo detector 30.

Figure 7A:
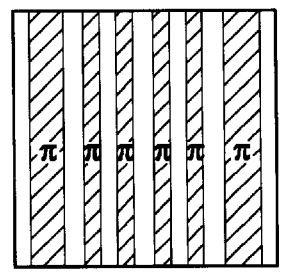
FIG. 7A and FIG. 7B show another structure of the second polarizing plate in FIG. 4 and a phase area of a light beam according to such a structure, respectively.
Figure 7B:
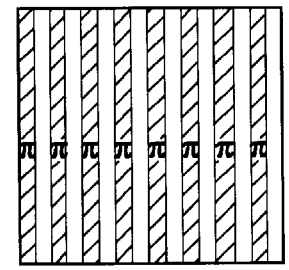

FIG. 7A shows another structure of the second polarizing phase plate 40 in FIG. 4. In FIG. 7A, the second polarizing phase plate 40 consists of 13 phase zones arranged to have a phase difference of 180° from the adjacent phase zones. Thus, sub-beams SB1 and SB2 reflected from the optical disc 22 and formed at the second photo detector 32 have 16 phase areas having a phase difference of 180° periodically as shown in FIG. 7B by means of the first and second polarizing phase plates 38 and 40. Accordingly, a distance between the sub-beams SB1 and SB2 formed at the second photo detector 32 is more lengthened.

As described above, the optical pickup apparatus according to the present invention can easily detect the sub-beams separately by utilizing the first and second polarizing phase plates each of which consists of a plurality of phase zones. Accordingly, a reproducing signal in which a crosstalk component has been eliminated optimally can be obtained by filtering a crosstalk component detected from each sub-beam by the photo detector in compliance with each frequency characteristic and then making an operation of the filtered component with a radio frequency signal detected from the main beam.

Figure 8:
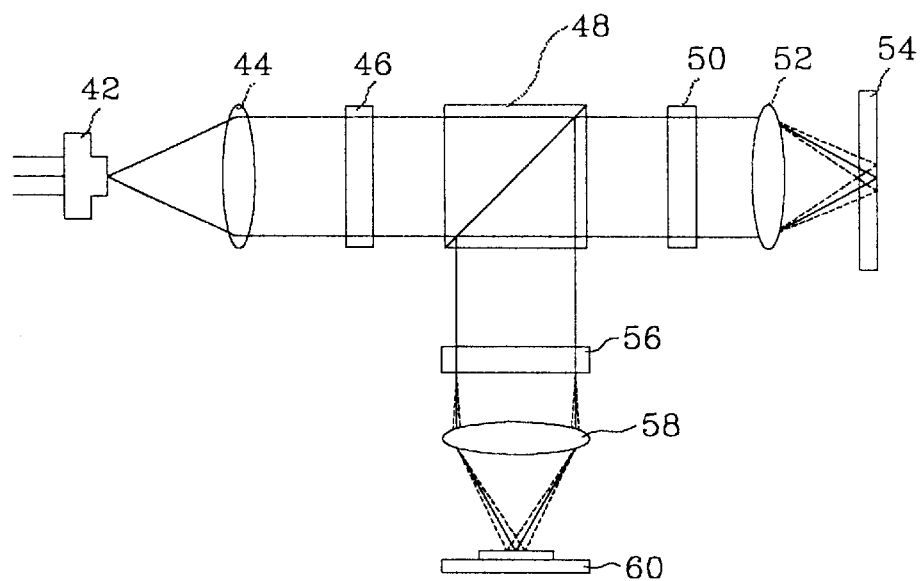
FIG. 8 is a schematic view showing the configuration of an optical pickup apparatus according to another embodiment of the present invention.

Referring now to FIG. 8, there is shown an optical pickup apparatus according to another embodiment of the present invention, which is capable of reducing a distance between sub-beams on an optical disc for eliminating a crosstalk so that it is suitable for a high-density optical disc. To this end, the optical pickup apparatus includes a light source 42 for generating a light beam, an objective lens 52 for focusing the light beam generated from the light source 42 onto the recording surface of an optical disc 54, a photo detector 60 for converting a light beam reflected from the optical disc 54 into an electrical signal, a beam splitter 48 arranged among the light source 42, the objective lens 52 and the photo detector 60, a collimator lens 44 and a first phase plate 46 arranged, in parallel, between the light source 42 and the beam splitter 48, and a second phase plate 56 and a sensor lens 58 arranged, in parallel, between the beam splitter 48 and the photo detector 60. Further, the optical pickup apparatus includes a λ/4 plate 50 arranged between the beam splitter 48 and the objective lens 53. The light source 42 generates a line-polarized beam. The collimator lens 44 converts a divergent light beam progressed from the light source 42 into the first polarizing phase plate 46 into a parallel light beam, thereby preventing a leakage of the light beam. The beam splitter 48 passes a light beam received, via the collimator lens 44 and the first phase plate 46, from the light source 42 in such a manner to be progressed toward the objective lens 52 and, simultaneously, reflects a reflective light beam reflected from the recording surface of the optical disc 54 and received via the objective lens 52 in such a manner to be progressed toward the photo detector 60. The objective lens 52 focuses a light beam received from the beam splitter 48 onto the recording surface of the optical disc 54. The sensor lens 58 focuses a reflective light beam reflected from the beam splitter 48 and received via the second phase plate 56 onto the photo detector 60.

Figure 9B:
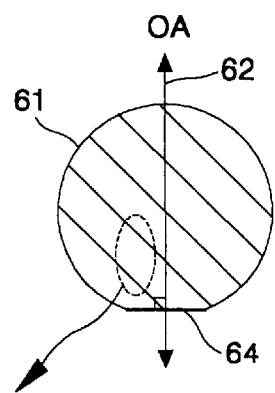
FIGS. 9A and 9B, hereinafter referred to as FIG. 9, show the structure of a phase plate according to an embodiment of the present invention.
Figure 9A:
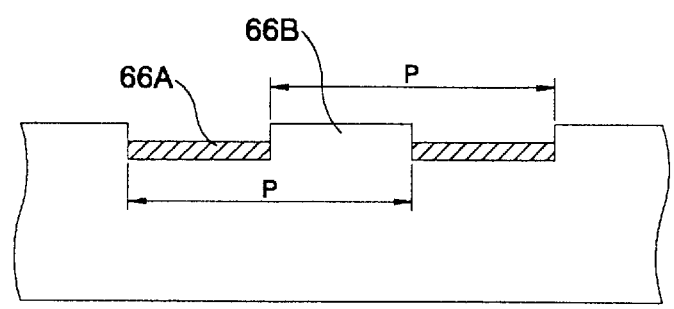

A phase plate applied to the present invention has a lattice structure as shown in FIG. 9, and which is selectively diffracted in accordance with a polarized direction of an incident light to produce three beams. To this end, the phase plate 61 selectively diffracts and transmits in a polarized direction of an incident light on the basis of its optical axis 42 using a substrate made from a birefringence material(e.g., LiNbO$_3$) worked into a lattice structure. In other words, the phase plate 61 transmits a polarization component perpendicular to a direction of its optical axis 62 as it is while diffracting and transmitting a polarization component parallel to a direction of its optical axis 62, thereby separating the beam. In order to separate the beam in this manner, the phase plate 61 allows a light beam transmitting a groove 66A and a land 66A to have a phase difference of 180° by doping the groove 66A formed by the lattice working with an appropriate doping material to change the refractive index of a desired line-polarized light, and thus allows the light beam to be separated into two beam and imaged. Also, the phase plate 61 indicates a direction of its optical axis 62 cuts visibly by cutting a surface perpendicular to its optical axis 62 to define an optical axis indicating surface 64. When the optical axis 62 of such a phase plate 61 is arranged slantingly on a light path, the light beam can be separated into three beams by utilizing only any one of vertical and horizontal line-polarized lights.

Figure 10A:
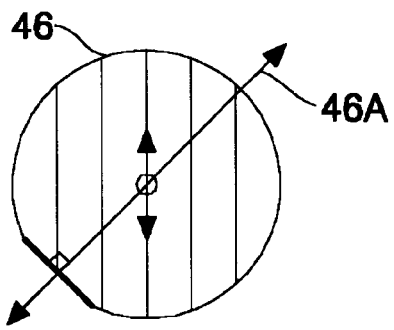
FIG. 10A and FIG. 10B show first and second phase plates according to a first embodiment of the present invention, respectively.
Figure 10B:
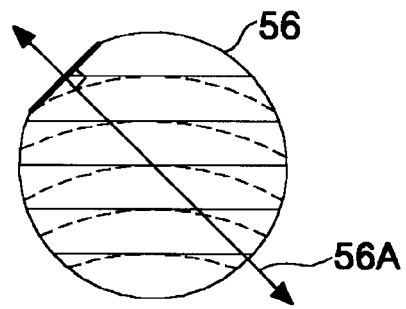
Figure 11A:
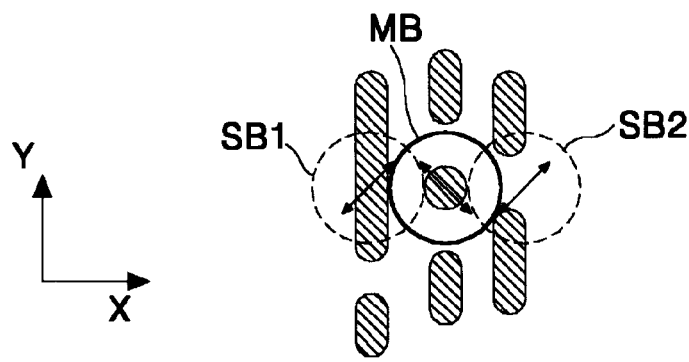
FIG. 11A and FIG. 11B represent three beams irradiated onto the track by the first phase plate in FIG. 10A and a reflective light beam irradiated onto the photo detector by the second phase plate in FIG. 10B, respectively.

Referring to FIG. 10A and FIG. 10B, there is shown a specific shape of first and second phase slates 46 and 56 according to a first embodiment of the present invention. In FIG. 10A, the first phase plate 46 diffracts an incident vertical line-polarized light to separate it into three beams, and allows the three beams to be irradiated, in parallel, onto the optical disc 54 in the radial direction thereof. To this end, the first phase plate 46 is arranged in such a manner that its optical axis 46A is inclined at a desired angle with respect to an incident optical axis and its lattice working direction is defined in parallel to the track direction. Accordingly, a vertical line-polarized light incident to the first phase plate 46 is separated into polarization components perpendicular to each other by the optical axis 46A of the first phase plate 46. The polarization components perpendicular to the optical axis 46A is transmitted straightly to be irradiated onto a target track as a main beam MB as shown in FIG. 11A. on the other hand, a polarization component parallel to the optical axis 46A of the first phase plate 46 is diffracted and transmitted and then is separated in parallel to each adjacent track in the lattice working direction to thereby be irradiated as sub-beams SB1 and SB2. In this case, the sub-beams SB1 and SB2 is irradiated in such a manner to be overlapped at each side of the main beam MB, and is used to eliminate a crosstalk component included in the main beam MB.

Figure 11B:
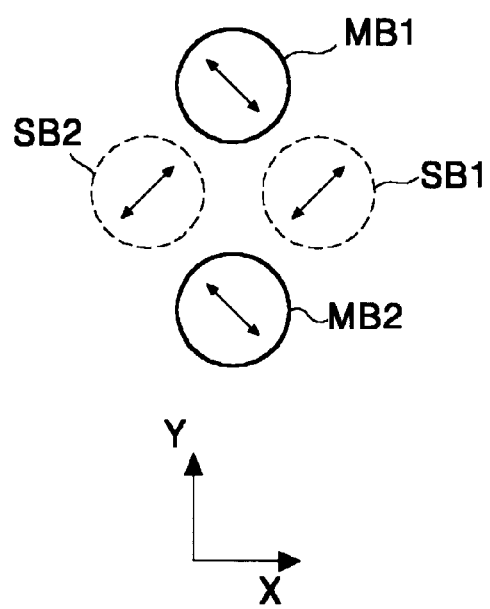

The second phase plate 56 shown in FIG. 10B transmits the sub-beams SB1 and SB2 reflected and received from the optical disc 54 straightly while diffracting and transmitting the main beam MB such that they are separated from each other, so as to detect each of three beams MB, SB1 and SB2 irradiated onto the optical disc 54 with being superposed. To this end, the second phase plate 56 is arranged on a light path in a shape of rotating the first phase plate 46 at a degree of 90°. Thus, the sub-beams SB1 and SB2 with a polarization component perpendicular to a direction of the optical axis 46A of the second phase plate 46 transmits the second phase plate 46 straightly to be irradiated, in parallel, onto the photo detector 60 in an X direction parallel to a radial direction of the optical disc 54 as shown in FIG. 11B. On the other hand, the main beams MB1 and MB2 with a polarization component parallel to a direction of the optical axis 56A of the second phase plate 56 is diffracted and transmitted to be separated in accordance with the lattice working direction, thereby being irradiated, in parallel, onto the photo detector 60 in a Y direction parallel to the track direction of the optical disc 54 as shown in FIG. 11B In order to detect both the main beams MB1 and MB2 and the sub-beams SB1 and SB2, the photo detector 60 includes four photo detecting cells Pad, PDb, PDc and PDd as shown in FIG. 12.

Figure 12:
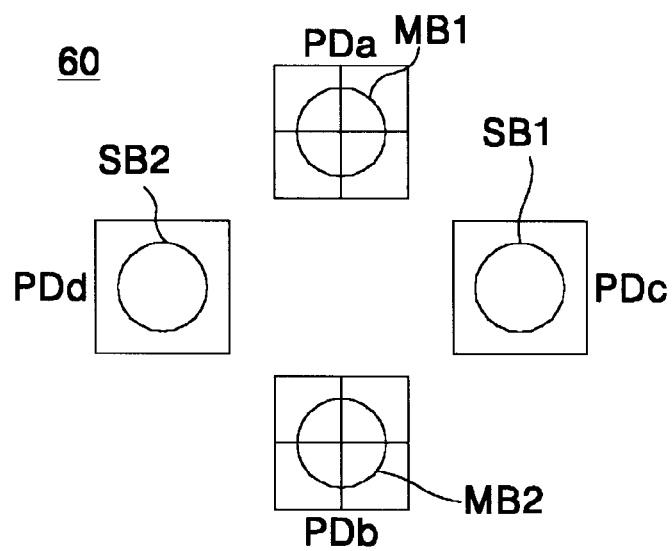
FIG. 12 shows the configuration of a photo detector for detecting the reflective light beam in FIG. 11B.

In the photo detector 60 shown in FIG. 12, the first and second photo detecting cells PDa and PDb are arranged, in parallel, in the Y direction so as to detect each of two separated main beams MB1 and MB2 while the third and fourth photo detecting cells PDc and PDd are arranged, in parallel, in the X direction so as to detect each of the sub-beams SB1 and SB2. Accordingly, a crosstalk component can be easily eliminated to detect an accurate reproducing signal, by subtracting a sum signal of light detecting signals detected from each of the third and fourth detecting cells PDc and PDd from a sum signal of light detecting signals detected from each of the first and second photo detecting cells PDa and PDb.

Figure 13:
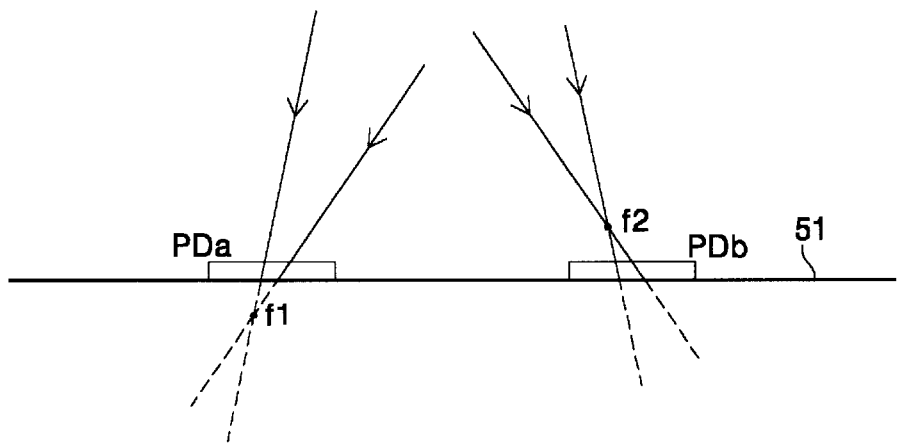
FIG. 13 represents a focus position of first and second main beams imaged at the first and second photo detectors by the second phase plate having a circular-arc shaped lattice-aperture in FIG. 10B.

Further, another embodiment of the second phase plate 56 shown in FIG. 10B can be provided to have its lattice working shape formed in a circular arc. In other words, the second phase plate 56 is designed into a lattice shape such that soot shapes, that is, focus lengths of the first and second main beams MB1 and MB2 separated by the second phase plate 56 are same or symmetrical. When a lattice shape of the second phase plate 56 is worked into a circular arc as indicated in a dotted line in FIG. 10B, a focusing servo becomes easier. More specifically, when a lattice shape of the second phase plate 56 is worked into a circular arc, a focusing position(f1, f2), that is, a focus length of the first and second main beams MB1 and MB2 formed at the photo detector 60 by the sensor lens 58 when the main beam reflected and received from the optical disc 54 passes the second phase plate 56 to be formed into the first and second main beams MB1 and MB2 has a symmetry with respect to a focus reference surface 51 as shown in FIG. 13. In this case, a focusing error component can be detected to perform a focusing servo by detecting the first and second sub-beams MB1 and MB2 by the first and second photo detectors PDa and PDb and comparing them.

Figure 14:
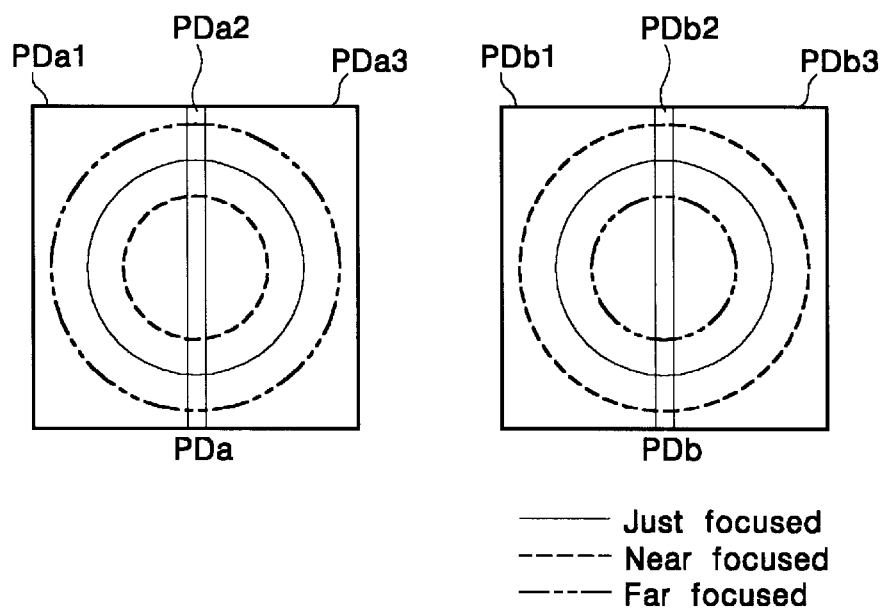
FIG. 14 shows another embodiments of the first and second photo detectors in FIG. 12.

Referring to FIG. 14, there are shown first and second photo detectors PDa and PDb for detecting the first and second main beams MB1 and MB2 and the spot size of main beams MB1 and MB2 formed at the first and second photo detectors PDa and PDb in accordance with a focus length. The first and second photo detectors PDa and PDb of FIG. 14 consists of first to third photo detecting segments PDa1, PDa2 and PDa3, or PDb1, PDb2 and PDb3 divided, in parallel, in the track direction of the optical disc 54. In FIG. 14, a dotted line represents when a spot of the main beams MB1 and MB2 is imaged in front of a focus surface 51, a solid line does when a spot is imaged on the focus surface 51, and a dot-broken line does when a spot is imaged behind the focus surface 51. In this case, a focus servo can be easily performed by detecting a focus error signal using a difference signal between photo detecting signals detected at each of the second photo detecting segments PDa and PDb located at the center of the first and second photo detectors PDa and PDb. To this end, the second photo detecting segments PDa2 and PDb2 of the first and second photo detectors PDa and PDb is same in area, and is arranged at such a position that a spot shape of the first and second main beams MB1 and MB2 has a symmetry. For instance, as shown in FIG. 14, the first and second photo detecting segments PDa1 and PDa2, or PDb1 and PDb2 may be set to have smaller areas than the adjacent first and third photo detecting segments PDa1 and PDa3, or PDb1 and PDb3 and arranged in the track direction or the radial direction. Also, various configurations, such as a case where the second photo detecting segments PDa2 and PDb2 of the first and second photo detectors PDa and PDb are arranged in a regular square shape at the middle portion, may be applied.

Figure 15A:
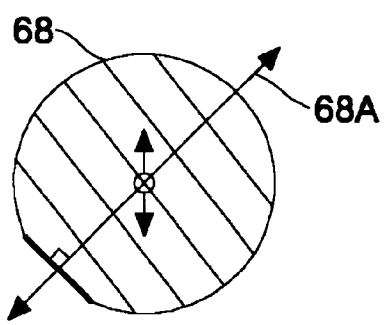
FIG. 15A and FIG. 15B show first and second phase plates according to a second embodiment of the present invention, respectively.
Figure 15B:
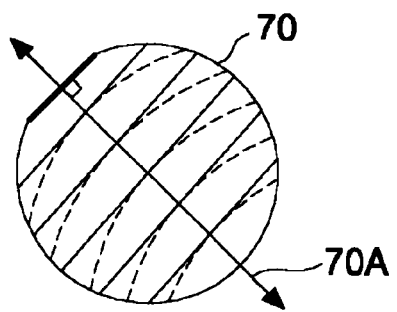
Figure 16A:
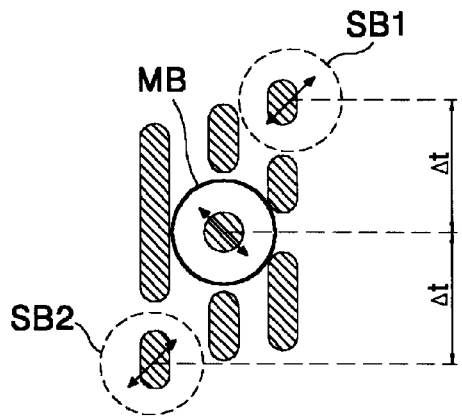
FIG. 16A and FIG. 16B represent three beams irradiated onto the track by the first phase plate in FIG. 15A and a reflective light beam irradiated onto the photo detector by the second phase plate in FIG. 15B, respectively.

Referring to FIG. 15A and FIG. 15B, there are shown detailed shapes of the first and second phase plates 68 and 70 according to a second embodiment of the present invention. In FIG. 15A, the first phase plate 68 is worked in such a manner to have the same optical axis direction as and a lattice working direction different from the phase plate 46 in FIG. 10A, thereby diffracting and transmitting an incident vertical line-polarized light to be divided into three beams MB, SB1 and SB2 and allowing three beams MB, SB1 and SB2 to be irradiated onto the optical disc 44 in the diagonal direction. More specifically, a vertical line-polarized light incident to the first phase plate 68 is separated into polarization components perpendicular to each other by an optical axis 68A of the first phase plate 68. A polarization component perpendicular to the optical axis 68A is transmitted straightly to be irradiated onto a target track as a main beam MB as shown in FIG. 16A. On the other hand, a polarization component parallel to the optical axis 68A of the first phase plate 68 is diffracted and transmitted to be separated in a diagonal direction with respect to each adjacent track in accordance with a lattice working direction, thereby being irradiated as sub-beams SB1 and SB2 as shown in FIG. 16A In this case, the sub-beams SB1 and SB2 is used to eliminate a crosstalk component included in the main beam MB. Particularly, as shown in FIG. 16A, when a main beam MB irradiated onto a target track with setting a track pitch smaller than a specific wavelength of optical spot diameter is irradiated in a pattern of extending into the adjacent tracks and the sub-beams SB1 and SB2 irradiated onto the adjacent tracks in the diagonal direction also is irradiated in a pattern of extending into a target track, a crosstalk component included in the main beam MB can be easily eliminated by utilizing the sub-beams SB1 and SB2. In other words, it is advantageously applicable to a high-density optical disc.

Figure 16B:
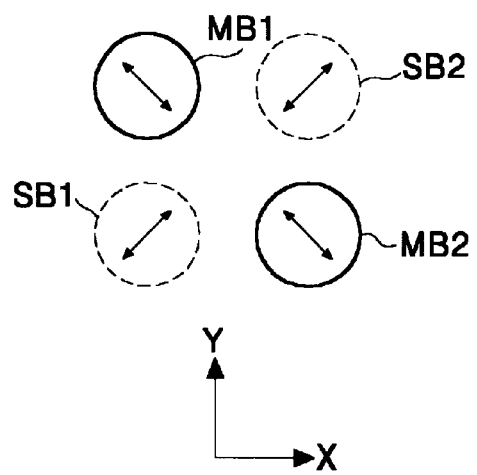

The second phase plate 70 shown in FIG. 11B allows three beams MB, SB1 and SB2 to be separated by transmitting a reflective sub-beams SB1 and SB2 straightly as it is while diffracting and transmitting a reflective main beam MB so as to detect a quantity of three beams MB, SB1 and SB2 irradiated onto the optical disc 54 in the diagonal direction and reflected therefrom accurately. To this end, the second phase plate 70 is arranged on a light path in a shape of rotating the first phase plate 68 at a degree of 90°. Thus, sub-beams SB1 and SB2 with a polarization component perpendicular to a direction of the optical axis 70A of the second phase plate 70 transmits the second phase plate 70 straightly to be irradiated, in parallel, onto the photo detector 50 in the right diagonal direction as shown in FIG. 16B. On the other hand, a main beam MB with a polarization component parallel to a direction of the optical axis 70A of the second phase plate 70 is diffracted and transmitted to be separated in accordance with the lattice working direction, thereby being irradiated, in parallel, onto the photo detector 60 in the left diagonal direction as shown in FIG. 16B. In order to detect the main beams MB1 and MB2 and the sub-beams SB1 and SB2 irradiated separately in this manner, the photo detector 60 includes four photo detecting cells PDa, PDb, PDc and PDd as shown in FIG. 17.

Figure 17:
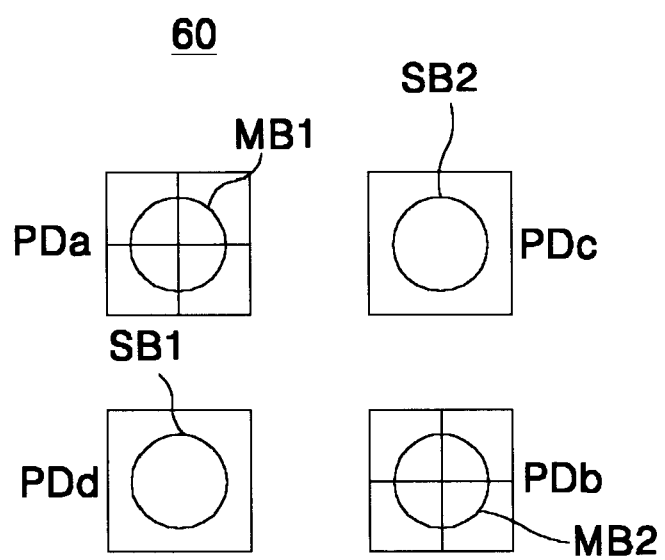
FIG. 17 shows the configuration of a photo detector for detecting the reflective light beam in FIG. 16B.
Figure 18:
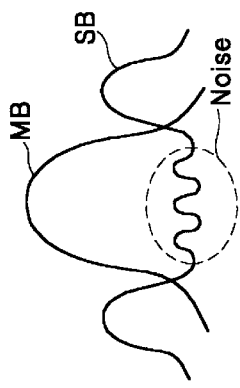
FIG. 18 represents a noise component involved in a main beam by sub-beams when the second phase plate in FIG. 15B is not used.

In FIG. 17, the first and second photo detecting cells PDa and PDb are arranged, in parallel, in the right diagonal direction so as to detect the separately irradiated main beams MB1 and MB2 while the third and fourth photo detecting cells PDc and PDd are arranged, in parallel, in the left diagonal direction so as to detect the sub-beams SB1 and SB2. Thus, a crosstalk component can be easily eliminated to detect an accurate reproducing signal by subtracting a sum signal(Sc+Sd) of light detecting signals Sc and Sd detected at the third and fourth photo detecting cells PDc and PDd from a sum signal(Sa+Sb) of light detecting signals Sa and Sb detected at the first and second photo detecting cells PDa and PDb. In this case, since each of the first sub-beam SB1, the main beam MB and the second sub-beam SB2 irradiated onto the optical disc 54 has an interval of $\Delta t$, an operation must be made by delaying the light detecting signals Sa and Sb detected from the first and second photo detecting cells PDa and PDb by $\Delta t$ while delaying the light detecting signal Sc detected from the third detecting cell PDc by $2\Delta t$.

Herein, if three beams MB, SB1 and SB2 separated in the diagonal direction by the first phase plate 68 without using the second phase plate 70 is detected at the photo detector 60 as it is, a noise component is generated at a zero order beam position of the sub-beams SB1 and SB2 to include a noise in the main beam signal, thereby causing a deterioration of the signal to noise ratio(S/N).

Figure 19:
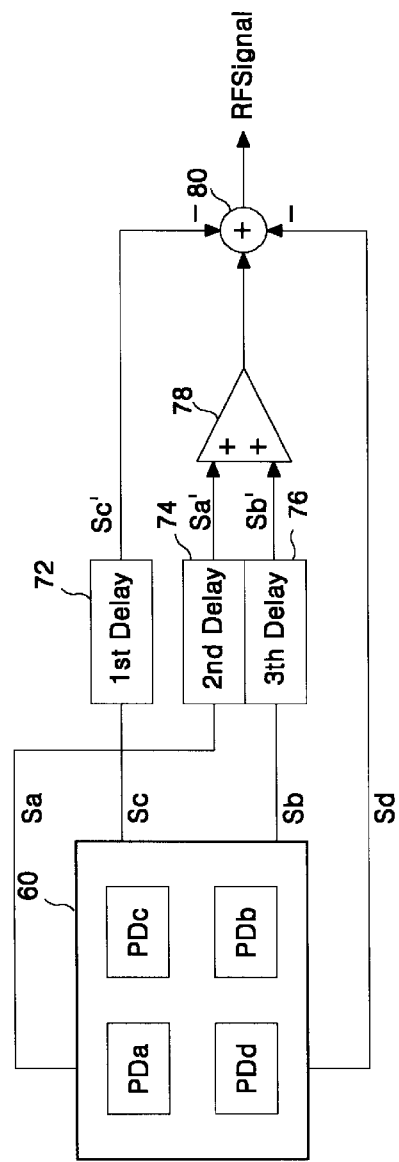
FIG. 19 is a block diagram showing the configuration of a signal detector for detecting a radio frequency signal using an output signal of the photo detector in FIG. 12.

Referring now to FIG. 19, there is shown the configuration of a signal processor for detecting a radio frequency signal by making an operation on the first to fourth light detecting signals Sa, Sb, Sc and Sd detected from the photo detector 60 shown in FIG. 17. The signal processor includes first to third delays 72, 74 and 76 connected to a photo detector 60, an adder amplifier 78 connected to the output terminals of the second and third delays 74 and 76, and a subtractor 80 connected to the output terminals of the adder amplifier 78, the first delay 72 and the photo detector 60. The second and third delays 74 and 76 delays first and second light detecting signals Sa and Sb detected from the first and second photo detecting cells PDa and PDb in the photo detector 60 by Δt; while the first delay 72 delays the third light detecting signal Sc detected from the third photo detecting cell PDc by 2Δt. The adder amplifier 78 adds and amplifies first and second light detecting signals Sa' and Sb' delayed by the second and third delays 74 and 76, and then outputs them. The subtractor 80 subtracts the third light detecting signal Sc' delayed by means of the first delay 72 and the fourth light detecting signal Sd from an output signal of the adder amplifier 78 to detect a radio frequency signal RF.

Returning to FIG. 15B, the second phase plate 70 can be formed in such a manner to have a lattice working shape of circular arc as indicated in the dotted line. In this case, the first and second photo detectors PDa and PDb in FIG. 17 is applied by the structure as shown in FIG. 14, so that a focusing error can be detected from a difference in signals detected at the first and second photo detecting cells PDa2 and PDb2 arranged at such a position that spot shapes of the first and second main beams MB1 and MB2 have a symmetry.

Meanwhile, the optical pickup apparatus shown in FIG. 8 further includes a λ/4 plate 50 for improving a focusing efficiency between the beam splitter 48 and the objective lens 52. The λ/4 plate 50 converts a line-polarized beam received from the beam splitter 48 into a circle-polarized beam to emit it toward the objective lens 52, and converts a circle-polarized beam reflected from the optical disc 54 and received via the objective lens 52 into a different component of line-polarized beam to emit it toward the beam splitter 48. In other words, when the λ/4 plate 50 is used, a polarization direction of a beam reflected from the recording surface of the optical disc 54 and returning thereto is in a state of being rotated at a degree of 90° with respect to an incident beam. In this case, the second phase plate 56 is no longer in a shape of being rotated at a degree of 90° with respect to the first phase plate 46, but it must be in a shape of rotating only a lattice working direction at a degree of 90° with respect to the first phase plate 46 without changing an optical axis of the phase plate.

Figure 20A:
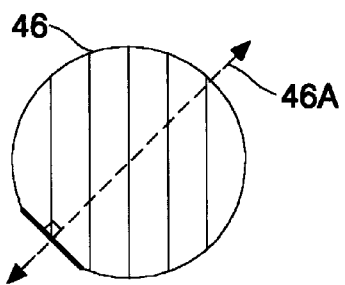
FIG. 20A and FIG. 20B show first and second phase plates according to a third embodiment of the present invention.
Figure 20B:
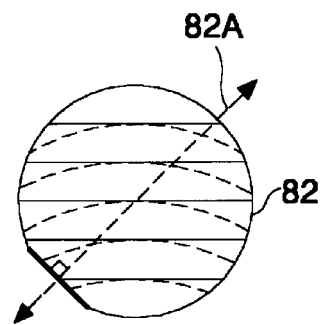

More specifically, if the first phase plate 46 according to the first embodiment as shown in FIG. 20A is used, then a second phase plate 82 must be provided such that a direction of optical axis 82A is identical and a lattice working direction only is rotated at 90° as shown in FIG. 20B compared with the first phase plate 46.

Figure 21A:
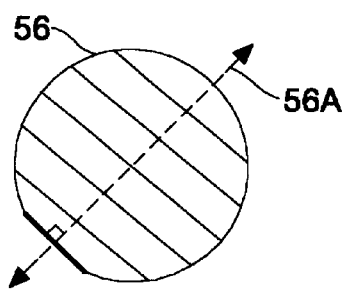
FIG. 21A and FIG. 21B show first and second phase plates according to a fourth embodiment of the present invention.
Figure 21B:
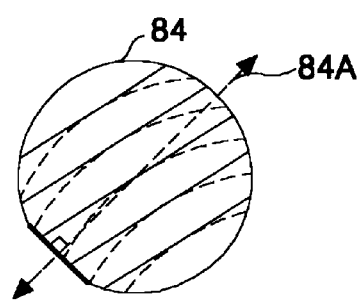

Otherwise, if the first phase plate 56 according to the second embodiment as shown in FIG. 21A is used, then a second phase plate 84 must be provided such that a direction of optical axis 84A is identical and a lattice working direction only is rotated at 90° as shown in FIG. 21B compared with the first phase plate 56.

Herein, the second phase plates 82 and 84 shown in FIG. 20B and FIG. 21B, respectively may be applicable to the configuration in which a lattice shape is worked into a circular arc so as to provide a configuration favorable to a focusing servo.

The light quantity intensity of the main beams and the sub-beams irradiated onto the optical disc 54 can be adjusted by changing an angle between a polarization direction of an incident light and an optical axis direction of the first phase plate. Also, a distance between the sub-beams on the optical disc 54 can be adjusted by changing a lattice space P of the first phase plate. In other words, a distance between the sub-beams is reduced when a lattice space P of the first phase plate is set to a large value, whereas a distance between the sub-beams is increased when a lattice space P of the first phase plate is set to a small value. In addition, the positions and spaces of the main beams and the sub-beams at the photo detector can be controlled in accordance with the lattice spaces of the first and second phase plates.

As described above, the optical pickup apparatus according to the present invention is capable of eliminating a crosstalk component easily by providing three beams applied advantageously to an optical disc in which a track pitch is set to be relatively smaller than a specific wavelength of light spot for the purpose of achieving a high-density using two phase plates with a polarization direction perpendicular to each other. Also, the optical pickup apparatus according to the present invention provides three beams by utilizing two phase plates with a polarization direction perpendicular to each other, so that a configuration of the optical system becomes simple to be suitable for providing a slim type device.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical pickup apparatus producing a sub-beam for eliminating a crosstalk component, comprising:

a first polarizing phase plate, arranged at a light path in a light-focusing optical system for irradiating a light beam onto an optical disc, and including at least two phase zones at each side of the center line thereof, said at least two phase zones have at least one phase zone which has a different width from the remaining phase zone or zones; and a second polarizing phase plate, arranged at a light path in a light-receiving optical system for detecting a reflective light from the optical disc, and including a predetermined number of phase zones, wherein a resulting sub-beam passing through the first and second polarizing phase plates has a periodic repetition of phase different distribution.

2. The optical pickup apparatus according to claim 1, wherein the number (N) of phase zones of said second polarizing phase plate satisfies the following equation:

N=2n+1 where n is an integer greater than 0.

3. The optical pickup apparatus according to claim 1, wherein the width of two phase zones arranged adjacent to the center line of said first polarizing phase plate is determined by a track pitch of a recording media read by utilizing said resulting sub-beam.

4. The optical pickup apparatus according to claim 1, wherein the phase difference between adjacent phase zones of said first and second polarity phase plates is substantially π (radian).

5. The optical pickup apparatus according to claim 1, further comprising:

a light source for generating a light beam;

an objective lens for focusing a light beam received, via the first polarizing phase plate, from the light source onto the optical disc;

a beam splitter for progressing a light beam from the first polarizing phase plate toward the objective lens and for progressing a reflective light beam received, via the objective lens, from the optical disc toward the second polarizing phase plate;

a polarizing beam splitter for separating a reflective light beam received via the second polarizing phase plate into main beams and sub-beams; and first and second photo detectors for detecting the main beams and the sub-beams separated at the polarizing beam splitter, respectively.

* * * * *